(No Model.)
J. P. HALLENBECK.
DRIVING MECHANISM FOR BICYCLES.
No. 555,242.  Patented Feb. 25, 1896.
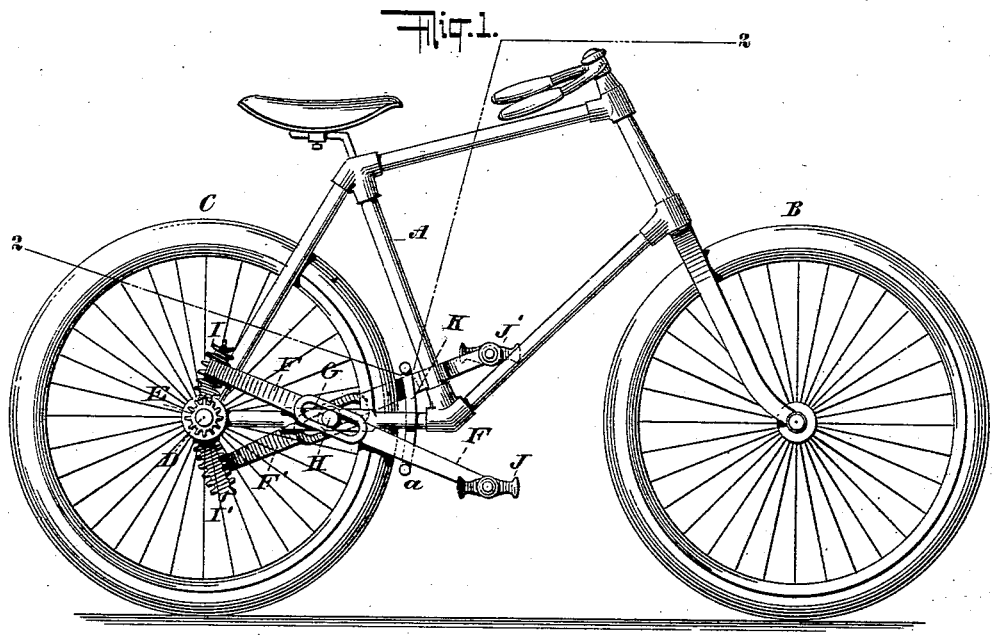
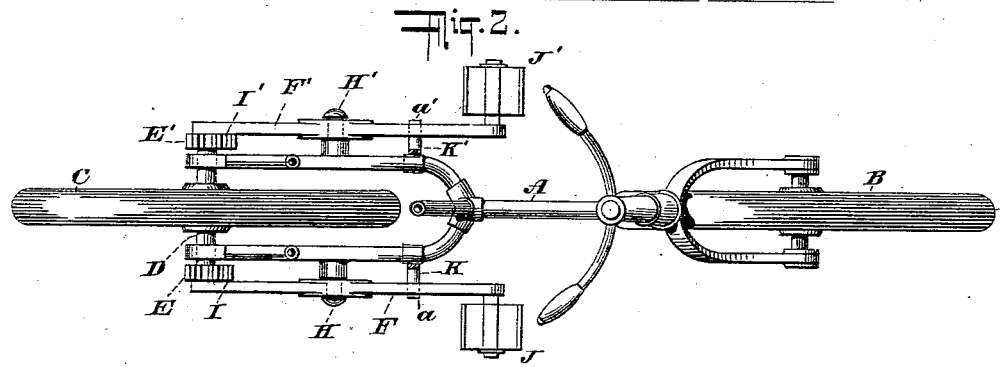
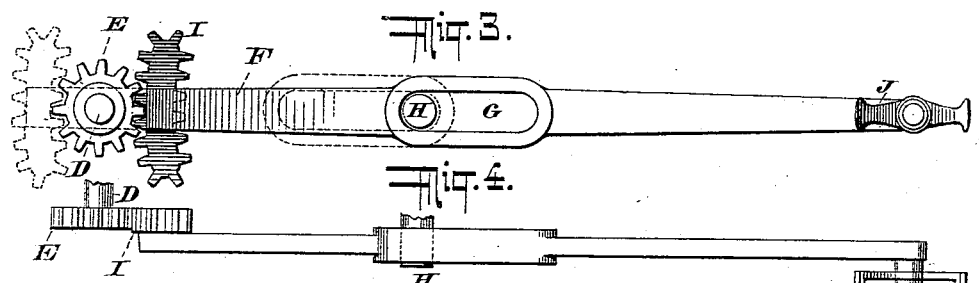
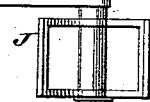
WITNESSES:
INVENTOR
Joseph P. Hallenbeck
BY
Augustus Dieterich
his ATTORNEY.

UNITED STATES PATENT OFFICE.

JOSEPH P. HALLENBECK, OF MOUNT VERNON, ASSIGNOR OF ONE-HALF TO WASHINGTON I. KILPATRICK, OF NEW YORK, N. Y.

DRIVING MECHANISM FOR BICYCLES.

SPECIFICATION forming part of Letters Patent No. 555,242, dated February 25, 1896.

Application filed January 8, 1895. Serial No. 534,199. (No model.)

*To all whom it may concern:*

Be it known that I, JOSEPH P. HALLENBECK, a citizen of the United States, residing at Mount Vernon, Westchester county, in the State of New York, have invented certain new and useful Improvements in Driving Mechanism for Bicycles, of which the following is a full, clear, and exact specification.

My invention has for its object, first, to dispense with the use of the endless chain and the revolving pedals now generally used in vehicles of the description to which this invention appertains, and, second, to provide a simple means whereby the power necessary to propel the bicycle may be utilized to the best advantage, and whereby the speed of the bicycle may be increased without adding to the weight of the machine.

The invention consists in the novel combination, connection, and arrangement of parts hereinafter more fully set forth and pointed out in the claims.

In the accompanying drawings, forming part of this specification, wherein like letters of reference indicate like parts, Figure 1 is a side elevation of a bicycle with my improved driving mechanism applied thereto. Fig. 2 is a top view thereof, partly in section, the same being taken on the line 2 2 of Fig. 1. Fig. 3 is an enlarged detail side view of the driving mechanism, and Fig. 4 is a top view thereof.

In the drawings, A represents the frame, B the front wheel, and C the rear of the bicycle; D, the axle of the rear wheel, having fixed at the opposite ends thereof to each side of the frame the pinions E E'.

F F' are the pedal-bars having slots G G' therein through which pass the pins H H' by means of which said pedal-bars are pivotally secured to the frame A, and for which the said pins H H' serve as fulcra. At the rear ends of said pedal-bars are secured toothed sectors I I', the teeth of which mesh with those of the pinions E E' on the rear axle, and at the forward ends of said pedal-bars are affixed the pedals J J'.

Secured to the frame A at each side of the rear wheel, directly in front of the pins G G', are the segments K K', provided with antifriction-stops $a\,a'$ arranged at the upper and lower ends thereof.

It is to be observed that I have two pinions fixed on the rear axle, and two sliding pedal-bars pivotally supported, one at each side of the frame A, provided with toothed sectors held in constant engagement with their respective pinions, and so arranged that one of the pedals shall always be in a position to receive power, which will in turn be communicated to the rear wheel.

It is with the downward movement of the pedal-bar that the power is applied, and at the commencement of this movement the toothed sector secured to the rear end thereof will have just passed to the rear of the pinion and its inner teeth have come into engagement with those of the pinion, and as the application of power to said pedal is continued and the same thereby depressed the pinion and rear wheel will be rotated.

It is to be further observed that inasmuch as the pedals are always in a relatively opposite position to each other, and adapted to be alternately depressed, the sectors attached to said pedal-bars will likewise be in relatively opposite positions, and by means thereof a uniform speed may be obtained, and by arranging said sectors to operate one a trifle in advance of the other the liability of said sectors and pinions becoming set at the point of dead-center may be entirely overcome.

The extreme vertical movement of the pedal-bars is limited by the antifriction-stops $a\,a'$ on the segments K K' secured to the frame A, and the horizontal movement limited by means of the slots H H' in the pedal-bars and pins G G' secured to the frame, thereby causing the pinions and sectors to be held in continuous engagement and the pedals to be maintained in their relatively opposite positions.

In the construction above described the moving parts are so arranged that the same may, when so desired, be inclosed by a suitable shield or screen to protect the garments of the rider therefrom.

Having thus described my invention, what I claim as new, and desire to secure by Letters Patent, is—

1. In a bicycle or similar vehicle, the combination of the rear wheel and axle, and pinions fixed on said axle with the pedal-bars pivotally supported upon the frame having pedals affixed to the forward ends and peripherally-toothed sectors secured to the rear ends thereof adapted to reciprocate toward and from the points of support of said pedal-bars, and to travel around the pinions aforesaid to rotate the same, and the axle to which said pinions and rear wheel are fixed as power is applied to the pedals, substantially as specified.

2. In a bicycle or similar vehicle, the combination of the rear wheel and axle, and pinions fixed on said axle with the rearwardly-yielding pedal-bars pivotally supported upon the frame provided with pedals and peripherally-toothed sectors meshing with the pinions on the rear axle, and adapted to travel around said pinions, and cause the same, and the axle to which said pinions and rear wheel are fixed to be rotated as power is applied to the pedals, substantially as specified.

3. In a bicycle or similar vehicle, the combination of the rear wheel and axle, and pinions fixed on said axle with the sliding pedal-bars pivotally supported on the frame, provided with pedals and peripherally-toothed sectors meshing with the pinions on the rear axle, and adapted to travel around said pinions, and cause the same and the axle to which said pinions and rear wheel are fixed, to be rotated as power is applied to the pedals, substantially as specified.

4. In a bicycle or similar vehicle, the combination of the rear wheel and axle, and pinions fixed on said axle at each end thereof outside of the frame with the sliding pedal-bars pivotally supported on said frame at both sides of the wheel, having pedals affixed to the forward ends, and peripherally-toothed sectors secured to the rear ends thereof meshing with the pinions on the rear axle, said sectors being held in continuous engagement with said pinions, and adapted to travel around the same, thereby causing the same, and the axle to which said pinions and rear wheels are fixed to be rotated as power is applied to, and the pedals alternately depressed, substantially as specified.

5. In a bicycle or similar vehicle, the combination of the rear wheel and axle, and pinions fixed on said axle with the sliding pedal-bars pivotally supported on the frame, having pedals affixed to the forward ends, and peripherally-toothed sectors to the rear ends thereof, the teeth of said sectors meshing with those of the pinions, and so arranged that when the inner teeth of one sector are engaged by the teeth of its respective pinion, the other sector will be in a relatively opposite position to the first-mentioned sector, and the outer teeth thereof engaged with the teeth of its respective pinion, whereby said pinions and the axle to which said pinions and rear wheel are fixed will be caused to rotate as power is applied to and the pedals alternately depressed, substantially as specified.

6. In a bicycle or similar vehicle the combination, of the rear wheel and axle and pinions fixed on said axle, with the sliding pedal-bars provided with slots to receive the pins secured to the frame upon which said sliding pedal-bars are pivotally supported, stops fixed on the frame in front of said pins to limit the vertical movements of the pedal-bars, said pedal-bars having pedals affixed to the forward ends, and peripherally-toothed sectors secured to the rear ends thereof, the teeth of which mesh with those of the pinions, and so arranged that when the inner teeth of one sector are in engagement with the teeth of its respective pinion, the other sector will be in a relatively opposite position to the first-mentioned sector, and its outer teeth in engagement with those of the pinion fixed on the end of the shaft opposite to where the first-mentioned pinion is fixed, whereby said pinions and the axle to which said pinions and rear wheel are fixed may be rotated as power is applied to, and the pedals alternately depressed, substantially as specified.

7. In a bicycle or similar vehicle, the combination of the frame A, of the rear wheel C and axle D having pinions E, E' fixed thereon with the sliding pedal-bars F, F' having slots G, G' therein through which extend the pins H, H' secured to the frame A adapted to support, and limit the horizontal movement of said sliding pedal-bars, and the segments K, K', provided with antifriction-stops $a$, $a'$ arranged in front of the pins H, H' likewise secured to the frame A to limit the vertical movement of said sliding pedal-bars, which are provided with pedals J, J', and peripherally-toothed sectors I, I', and adapted to engage with the pinions E, E', respectively on the axle D, and rotate said pinions E, E', axle D, and wheel C fixed thereon when power is applied to, and the pedals alternately depressed, substantially as herein shown and described.

Signed at the city of New York, in the county and State of New York, this 3d day of January, 1895.

JOSEPH P. HALLENBECK.

Witnesses:
WASHINGTON I. KILPATRICK,
GUSTAVE DIETERICH.